United States Patent Office 3,109,722
Patented Nov. 5, 1963

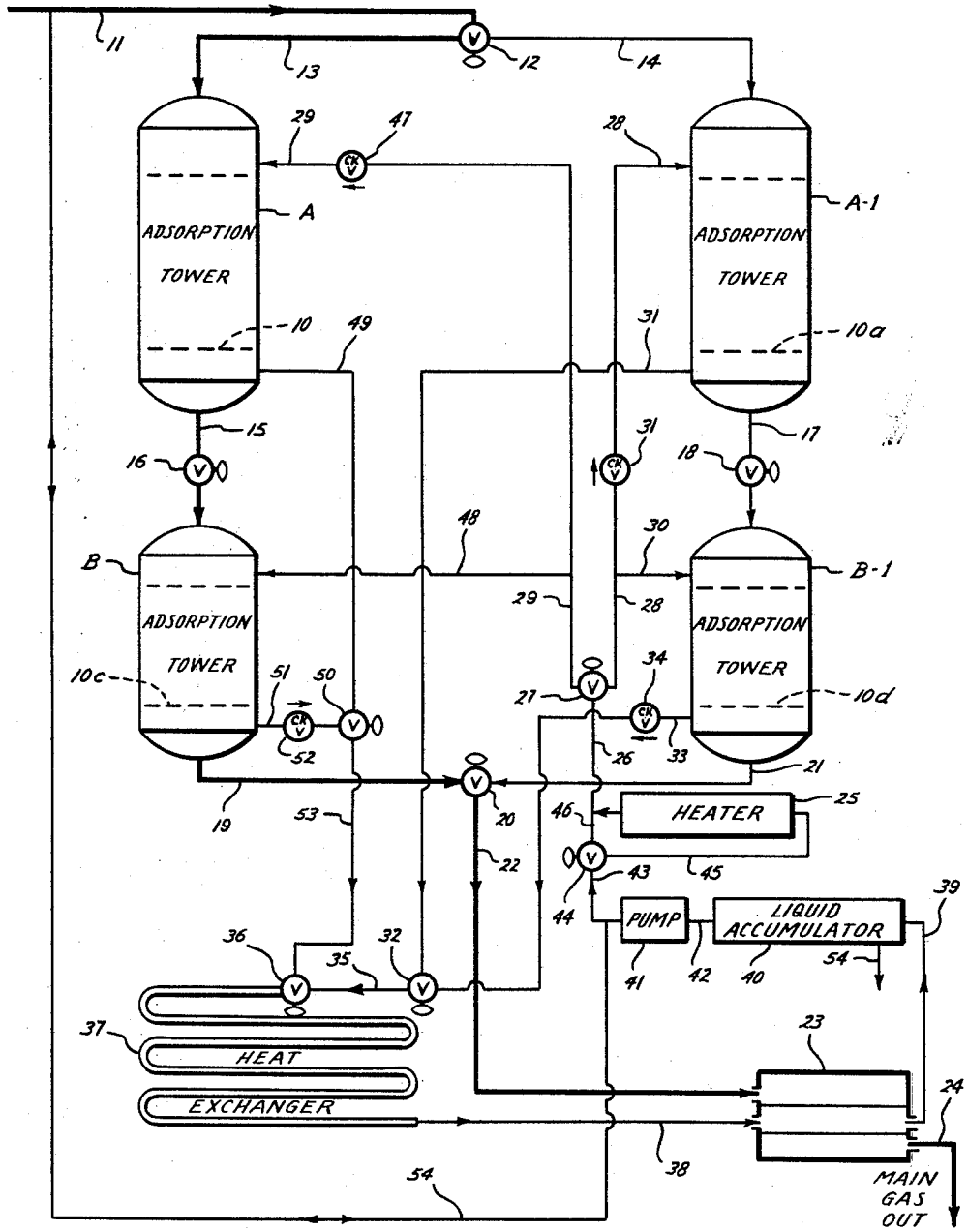

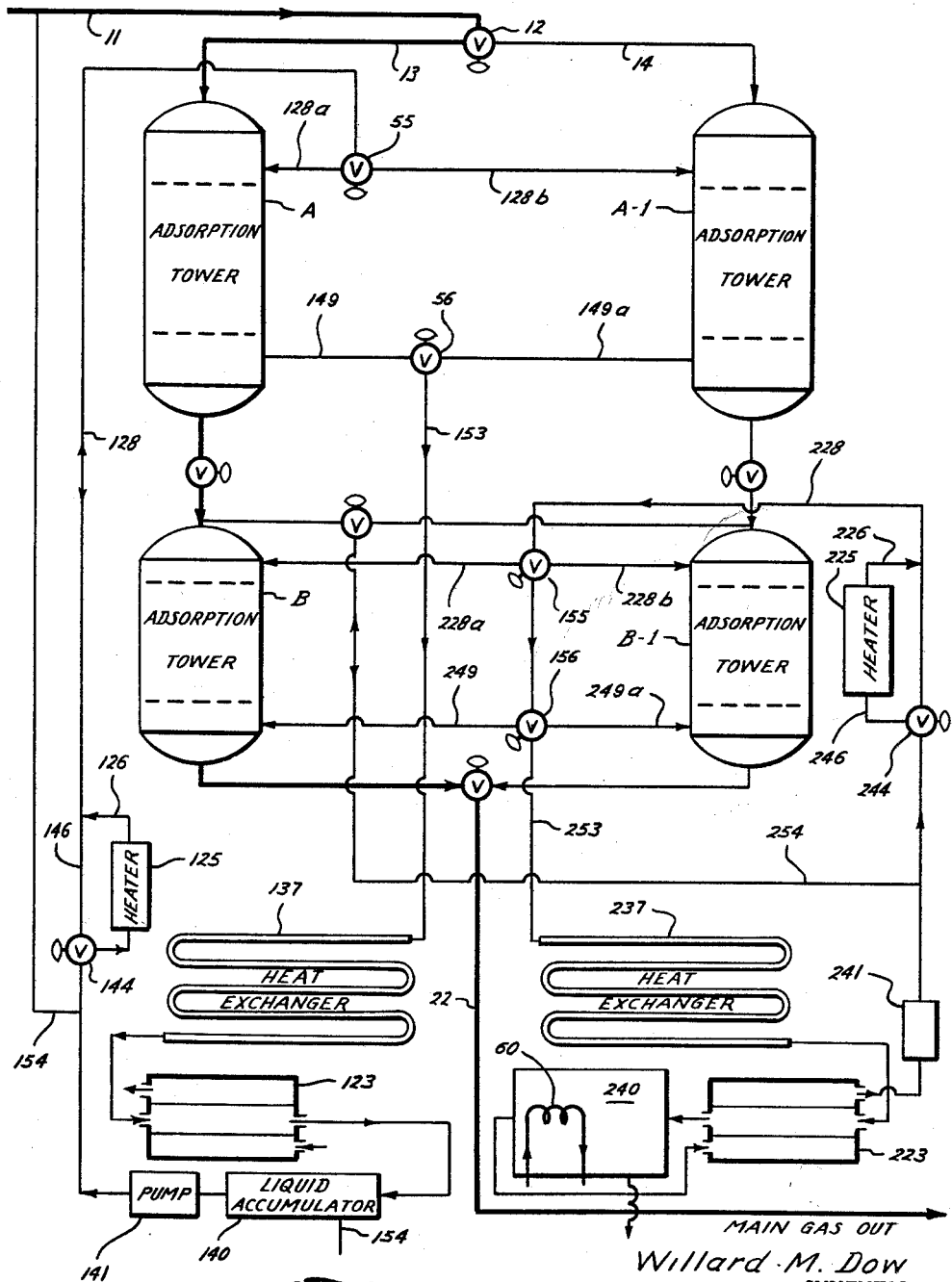

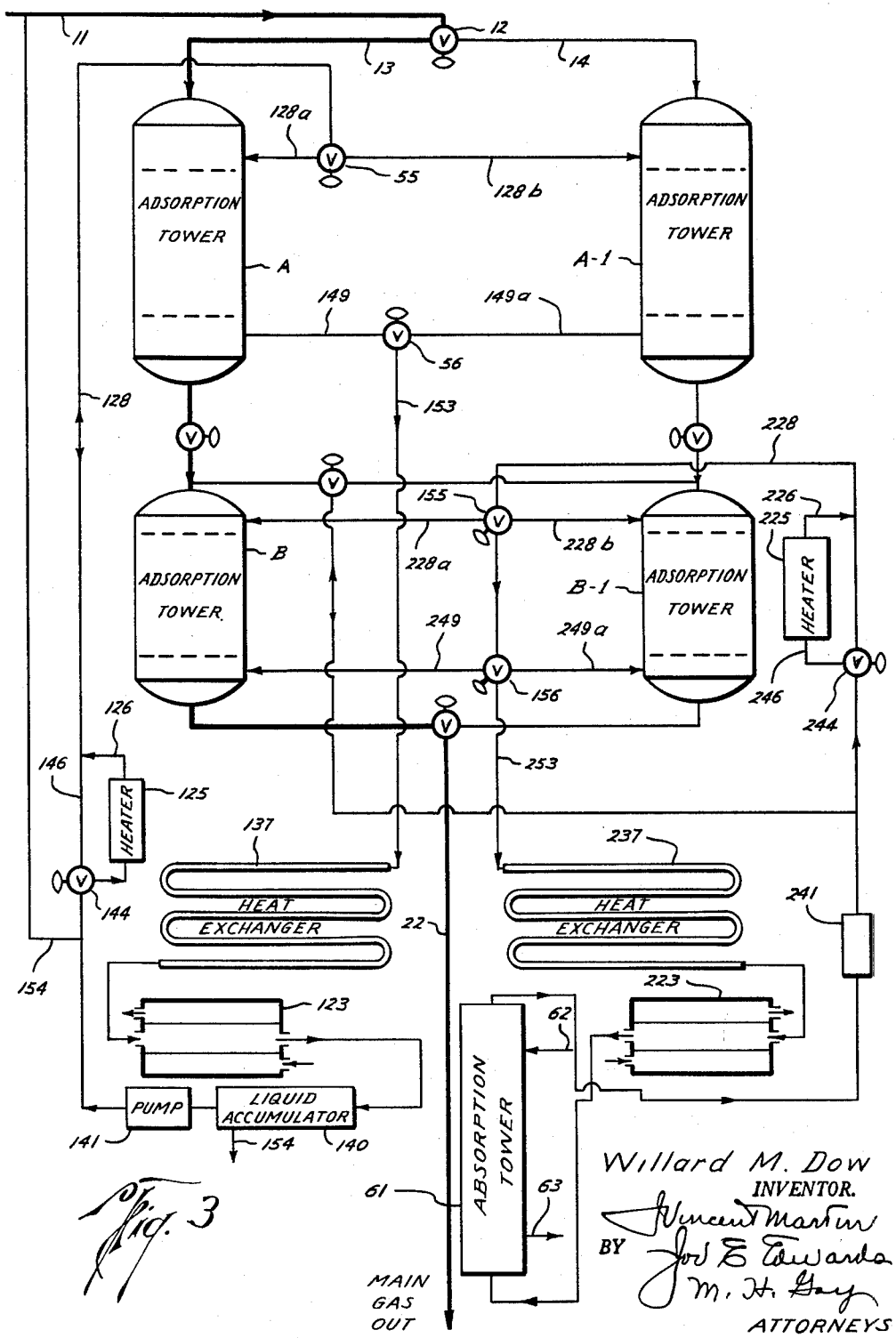

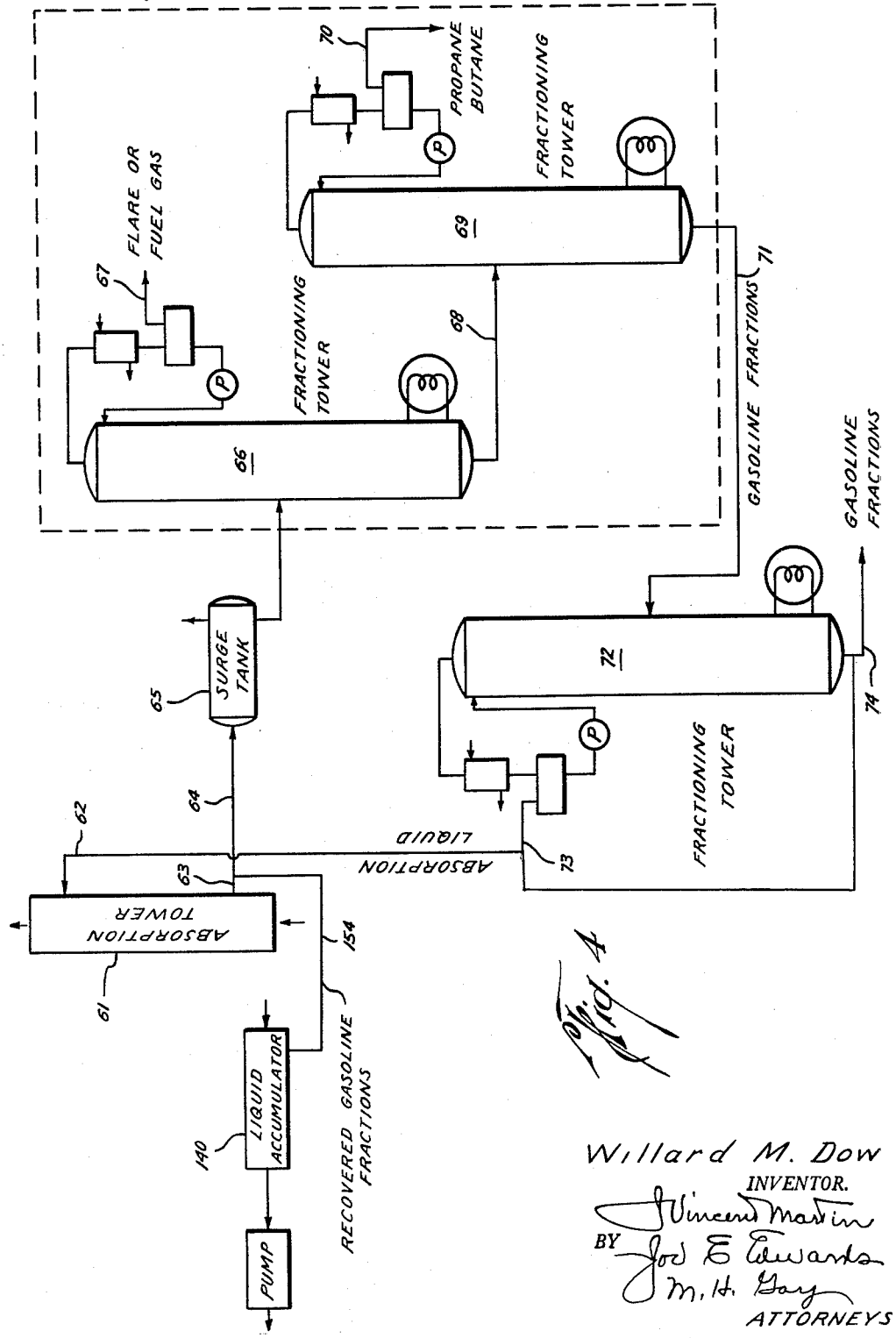

3,109,722
PROCESSES FOR RECOVERING HYDROCARBONS
FROM GAS STREAMS
Willard M. Dow, Houston, Tex., assignor, by mesne assignments, to National Tank Company, Tulsa, Okla., a corporation of Nevada
Filed July 27, 1959, Ser. No. 829,867
14 Claims. (Cl. 55—21)

This invention relates to new and useful improvements in processes for recovering hydrocarbons from gas streams.

The invention is an improvement upon the process disclosed in my prior Patent No. 2,880,818, dated April 7, 1959. Such prior patent discloses an adsorption process employing a pair of beds of adsorbent material together with a unique regeneration gas system which effects an increase in the recovery of hydrocarbon fractions from a main gas stream. However, because of the inherent characteristics of the usual adsorbent material, such as activated charcoal, silica gel or activated alumina, it has been found that, although some of the lighter hydrocarbons in the range of LPG components are recovered, such prior process primarily recovers the heavier gasoline components from the gas stream.

It is, therefore, one object of this invention to provide an improved process which will efficiently recover the LPG components or fractions, such as ethane, propane and butane, in addition to efficient recovery of the gasoline components or fractions, such as the pentanes, hexanes and heptanes.

Another object is to provide an improved process which will extract and recover both the lighter as well as the heavier hydrocarbons from a gas stream, and which is so practiced that practical, long-life service of the adsorbents used, especially with respect to the adsorbent employed for extraction of said lighter hydrocarbons, is assured.

An important object of the invention is to provide an improved adsorption process which involves the use of two adsorption zones through which the main gas stream is directed in series flow, with the first zone functioning to adsorb the heavier hydrocarbon fractions or gasoline components, and the second zone functioning to adsorb the lighter hydrocarbon fractions or LPG components; the arrangement protecting the second zone from contamination and possible fouling by said heavier hydrocarbons to thereby maintain the adsorptive capacity of said second zone at a high level in actual service and thereby assure efficient adsorption of said lighter hydrocarbon fractions.

A further object is to provide a process, of the character described, wherein two separate zones, one containing one type of adsorbent particularly adapted to adsorb heavier hydrocarbons and the second containing a different absorbent particularly suitable for adsorbing the lighter hydrocarbons, may be employed to obtain maximum recovery of both the heavier and lighter hydrocarbon fraction from the gas steam; the process lending itself to proper sizing of the adsorption zones in accordance with the ratio of concentrations of the fractions in the inlet gas stream, whereby efficient recovery from gas streams of varying composition may be accomplished.

A particular object is to provide a process, of the character described, wherein the gas stream may be dehydrated as well as stripped of the gasoline and LPG components, whereby extremely efficient condensation of recovery of the lighter LPG components can be effected by a supplemental refrigeration step; the dehydration of the stream permitting condensation of the lighter LPG components to be carried out at a temperature far below the normal freezing or hydrate temperatures of the inlet gas steam, whereby maximum recovery of the lighter components may be accomplished.

Another object is to provide a process, of the character described, wherein the lighter hydrocarbons are extracted from the adsorbent material, are condensed and then recovered separately from the extraction, condensation and recovery of the heavier hydrocarbons, thereby making it possible to subject the gas steam which extracts said lighter hydrocarbons to desirable treatment, such as refrigeration or absorption, to accomplish maximum recovery of said lighter hydrocarbons.

Still another object is to provide an improved process, of the character described, which may utilize the unique regeneration system disclosed in my prior Patent No. 2,880,818, whereby a relatively small volume of regeneration gas may be employed and also whereby proper conditioning of the regeneration gas is obtained to assure efficient recovery of the desirable components.

Another object is to provide an improved process involving one zone for adsorbing heavier hydrocarbons and a separate zone for adsorbing lighter hydrocarbons, together with means for regenerating each zone; the regeneration of the separate adsorption zones being carried out in such manner that the zone in which the lighter hydrocarbons are adsorbed is protected from contact with the recovered heavier hydrocarbons during the regeneration cycle, whereby contamination of said zone is prevented.

A particular object is to provide a method wherein two adsorption zones which are in series flow are switched to the main stream adsorption step at the same instant, whereby any adverse effect of temporary heat waves upon the downstream bed, which adverse effect might be caused by the flushing out of retained heat from the upstream bed, is eliminated.

A further object is to provide a method, of the character described, in which a liquid adsorption stream may contact the regeneration gas stream, after the latter has extracted the adsorbed liquid fractions from the adsorption zone, in a proper manner and time to increase the recovery efficiency from the regeneration gas stream of the desired liquid products.

The construction designed to carry out the invention will be hereinafter described, together with other features thereof.

The invention will be more readily understood from a reading of the following specification and by reference to the accompanying drawings forming a part thereof, wherein an example of the invention is shown, and wherein:

FIGURE 1 is a schematic flow diagram of the process and apparatus, constructed in accordance with the invention, FIGURE 2 is a similar view of a modified form of the invention, FIGURE 3 is a similar view of still another modification of the invention, and FIGURE 4 is a schematic flow diagram illustrating one type of fractionation which may be employed in separating the recovered liquids into final products.

In the drawings, the letter A designates a vertical vessel or adsorption tower which has a bed of adsorbent material 10 disposed therein. The particular adsorbent material which is employed is subject to variation, but it has been found that silica gel, activated charcoal or activated alumina may be employed, although, as will hereafter appear, the silica gel is preferable in the tower A. A second vertical vessel or adsorption tower A-1 has a similar bed 10a of adsorbent material therein, and the beds are adapted to be operated in the usual manner with one on an adsorbing cycle and the other on a regeneration cycle.

A main gas stream inlet line 11 has connection with a three-way selector inlet valve 12, and a conductor 13 extends from the valve to the tower or vessel A, while a similar conductor 14 extends from the valve to the second tower A-1. The position of the valve 12, which may be pressure-operated and suitably controlled by any well-known control mechanism, will determine the path of flow from the main inlet 11 to either one or the other of the adsorption towers A and A-1.

A discharge line 15 extends from the lower portion of the adsorption tower A and communicates with the upper end of a third adsorption tower B whereby the towers A and B are connected in series flow relationship. A suitable pressure operated valve 16 is connected in the line 15 and is in an open position when the towers A and B are on an adsorbing cycle, said valve being closed when said towers are on a regeneration cycle.

The tower B also contains a bed 10c of adsorbent material which, as will hereinafter appear, is preferably activated charcoal, and the flow of the main gas stream after passing through the adsorption tower A will be directed through adsorption tower B. The adsorption tower A-1 communicates through a discharge line 17 having a suitable valve 18 therein with the upper end of a fourth adsorption tower B-1, whereby the towers A-1 and B-1 are connected in series flow relationship. The tower B-1 is similar to the tower B and includes a bed of adsorbent material 10d. A discharge line 19 extends from the lower end of the adsorption tower B and is connected with a three-way selector outlet valve 20. This valve also has connection through a discharge line 21 which extends from the adsorption tower B-1. The main gas stream discharge conductor 22 leading from the outlet selector valve 20, passes through a heat exchanger 23 and extends from the heat exchanger to conduct the main gas stream from the system at the point 24 in FIGURE 1.

When the control valves 12 and 20 are in one position, the main gas stream from the inlet line 11 will flow through valve 12, conductor 13, the bed 10 in the adsorption tower A, line 15 and then through the bed 10c of the adsorption tower B. As the stream flows through the towers A and B, the desirable hydrocarbon fractions are extracted from the stream, and the stripped main gas stream is discharged from tower B through the line 19, past valve 20, and finally outwardly through the discharge conductor 22. At the time that the towers A and B are on an adsorbing cycle, the towers A-1 and B-1 are on a regeneration cycle.

After a predetermined lapse of time, which is set in accordance with particular conditions, the control valves 12 and 20 are operated to shut off flow of the main gas stream to and from the adsorption towers A and B; upon a shift in the position of said valves 12 and 20, the main gas stream is directed from inlet line 11, through valve 12, through conductor 14, and into the upper portion of the adsorption tower A-1. From this point the main gas stream, after passing through the bed 10a of tower A-1, flows through conductor 17, valve 18, and into the adsorption tower B-1, flowing through the adsorbent bed 10d therein and discharging through the conductor 21. From conductor 21 the stream flows past valve 20 and finally out through the main discharge line 22. During this period, the towers A-1 and B-1 are on an adsorbing cycle, and hydrocarbon fractions are removed from the main gas stream by the beds of adsorbent material in said towers.

The time cycle of each adsorbing period is predetermined and is preferably controlled by a suitable automatic control arrangement (not shown) which is well known in this art. The unit may be set to operate on a time cycle, or it may be operated in accordance with temperature conditions; in either case, the flow is switched at the pre-selected time. After each pair of towers has been on an adsorbing cycle for a predetermined length of time, the beds of adsorbent material therein will become saturated with the hydrocarbon fractions which are removed from the main gas stream. It is then desirable to extract or strip the adsorbed hydrocarbon fractions from the beds which extraction regenerates or reactivates beds, and this is accomplished by directing a heated regeneration gas through said beds. The hot regeneration gas extracts the hydrocarbon fractions from said beds by picking up such hydrocarbon fractions and carrying them as vaporized liquids from the adsorbing tower. In the present arrangement, the regeneration gas is directed through that pair of towers which is not on an adsorbing cycle, that is, when the main gas stream is flowing through the adsorption towers A and B, heated regeneration gas is directed through towers A-1 and B-1 so that the latter are on a regeneration cycle.

The regeneration gas is circulated through a separate and independent system or circuit which, as shown in FIGURE 1, includes a suitable heater 25 which provides a heating zone in the circuit. A conductor 26 extends from the heater 25 and has connection with a selector valve 27, which valve is arranged to direct the hot regeneration gas from the conductor 26 to either a line 28 or a line 29. Assuming the adsorption towers A-1 and B-1 to be on a regeneration cycle, the position of valve 27 is such that the hot regeneration gas flows from the heater and into the line 28. As shown in FIGURE 1, line 28 extends upwardly and enters the upper end of the adsorption tower A-1. A branch line 30 extends from the regeneration line 28 to the upper end of the adsorption tower B-1. A suitable check valve 31 which prevents reverse flow through line 28 is disposed between the adsorption tower A-1 and the branch line 30 and prevents reverse flow through line 28.

Assuming towers A-1 and B-1 to be on the regeneration cycle, the hot regeneration gas flowing upwardly through line 28 enters the upper end of tower A-1 and passes downwardly through the adsorbent bed 10a within this tower. As it flows through the tower, the hot regeneration gas picks up and extracts the hydrocarbon fractions from the bed. The regeneration gas stream leaves the tower A-1 through an outlet conductor 31 which has its other end connected with a splitter valve 32.

A portion of the regeneration gas flowing through line 28 is conducted through the branch line 30 into the upper end of the tower B-1, and this gas stream flows downwardly through the bed 10d of said tower and functions to pick up the hydrocarbon fractions therefrom so as to regenerate and reactivate the bed. From the tower B-1 this regeneration gas stream is conducted to the splitter valve 32 through an outlet line 33. A suitable check valve 34 which prevents reverse flow in line 33 is mounted therein.

From the foregoing it will be seen that the heated regeneration gas is conducted from the heater and is divided so that a portion thereof is directed through tower A-1 while another portion thereof is directed through tower B-1. After passing through the towers, the divided regeneration gas streams are recombined at the valve 32, and from this point the combined regeneration stream is passed through a conductor 35, through a selector valve 36, and into and through a heat exchanger 37 which is illustrated as of the atmospheric type. From the heat exchanger 37, wherein cooling of the regeneration gas stream is accomplished, the stream flows through line 38 and then through another heat exchanger 23, passing in heat-exchange relationship with the main gas stream which accomplishes further cooling of the regeneration stream. From the heat exchanger the regeneration gas, now having condensed hydrocarbon fractions therein, is conducted through line 39 to a liquid accumulator 40 wherein the liquids are removed from the stream. The heat exchangers and the accumulator form a condensing and separating zone in the regeneration circuit.

A pump 41 is connected with the liquid accumulator through pump inlet line 42, and the pump outlet line 43 has connection with a by-pass valve 44; from valve 44 the regeneration circuit is completed by the conductor 45 extending to the inlet of the heater. When it is desired to by-pass the heater 25, the valve 44 is operated and gas from the pump outlet 43 is directed through a short by-pass line 46.

When the flows through the pairs of towers are switched to place the towers A–1 and B–1 on an adsorbing cycle, the towers A and B are placed on regeneration. In such case, the valve 27 in the regeneration circuit directs the flow of regeneration gas into line 29, instead of line 28. Line 29 extends to the upper end of the adsorption tower A and has a suitable check valve 47 mounted therein. Line 29 also has a branch line 48 which extends to the upper end of tower B.

With the towers A and B on regeneration, the regeneration gas flows upwardly through the line 29 and to the upper end of tower A, then through the adsorbent bed 10 in said tower. The regeneration gas is discharged from tower A through a discharge line 49 which is connected with a splitter valve 50, this valve being similar to the valve 32 which is connected with the outlets from the towers A–1 and B–1. At the same time, a portion of the regeneration gas is flowing through the branch line 48 and through tower B, discharging from said tower through an outlet conductor 51 which also has connection with the splitter valve 50. A suitable check valve to prevent reverse flow through line 51 is mounted in said line. From the splitter valve, which recombines the two regeneration streams which have passed through towers A and B, flow is directed through a line 53 which has connection with the selector valve 36. It will be obvious that selector valve 36 is actuated each time that the pairs of towers are switched from adsorbing to regeneration and from regeneration to adsorbing. As explained, the regeneration gas then passes through the heat exchangers 37 and 23, then through the liquid accumulator, and is returned to the pump to be recycled through the circuit.

The basic regeneration circuit disclosed herein is substantially the same as that fully disclosed and described in my prior Patent No. 2,880,818, dated April 7, 1959. During each regeneration cycle the hot regeneration gas is circulated during the first portion of the cycle, and then during the remainder of the cycle said regeneration gas is circulated without the application of heat. Thus valve 44 is in a position circulating the regeneration gas through the heater 25 during the first portion of the cycle; during the latter portion of the cycle, the valve 44 is in a position connecting the pump discharge line 43 and the by-pass line 46, whereby regeneration gas without the application of heat is directed through the particular adsorption towers which are on the regeneration cycle. The use of cool regeneration gas during the latter portion of the cycle results in cooling the beds or at least the upper portion of such beds prior to the time that the towers are switched over to the adsorbing cycle. Thus, each regeneration cycle includes a heating period which is of sufficient length to strip the beds of the hydrocarbon fractions, followed by a cooling period which cools said beds.

The regeneration gas is circulated through a circuit which is separate from the main gas stream flow. By confining the gas in its own circuit and constantly recycling the major portion thereof, said major portion, which has become saturated with the desirable hydrocarbon fractions, is not returned to the main gas stream upon the completion of each regeneration cycle; instead, the major portion of the stream is retained in the circuit. Although the regeneration stream is in a saturated condition, the separate circuit arrangement makes it possible to employ a relatively small volume of regeneration gas and therefore, although saturated, the amount of hydrocarbon fractions contained in the regeneration circuit is kept to a minimum.

The regeneration gas is heated and then cooled in its flow through its circuit, and these variations in temperature result in pressure variations in said circuit. As explained in my prior Patent No. 2,880,818, where a relatively small volume of regeneration gas is employed, the gas is heated to a higher degree in order to assure efficient stripping and this accentuates the pressure variations which occur. In order to take care of these pressure variations and also to properly condition the regeneration gas in order to obtain maximum recovery of the hydrocarbon fractions, a balancing or breather line 54 has one end connected to the outlet conductor 44 which extends from the pump 41; the other end of line 54 has connection with the main gas stream 11 at a point upstream of the adsorption towers. During the heating period of a regeneration cycle, the heat applied by the heater increases the pressure of the regeneration gas to such an extent that the pressure is greater than the pressure in the main gas stream flowing through line 11, and thus a portion of the regeneration gas may breathe out and flow through line 54 to become admixed with the main gas stream. This breathing out continues only until pressure balance is obtained. The regeneration gas stream is saturated with hydrocarbon constituents at its particular pressure and temperature, but the regeneration gas exits from the circuit after cooling and also after all liquids have been removed, so that the regeneration gas is carrying out a minimum of the hydrocarbon fractions.

When the cooling period of the regeneration cycle commences, the regeneration gas by-passes the heater and is circulated through the system without application of heat. As the regeneration gas is cooled, the pressure of the main gas stream may be greater than that of the regeneration stream, and a portion of the main gas from the inlet line 11 may flow through line 54 and "breathe in" to the regeneration gas circuit. However, the main gas stream is relatively dilute as compared with the saturated regenerated gas and enters the regeneration gas circuit downstream of the liquid accumulator. This dilution of the regeneration gas circuit conditions the regeneration gas to assure maximum recovery upon the next regeneration cycle.

From the foregoing, it will be seen that a process and apparatus is provided wherein one pair of adsorption towers is on an adsorbing cycle while another pair of towers is on regeneration. It is important to note that the arrangement is such that the main gas stream is directed through the two towers on the adsorbing cycle in series flow. Thus, when the main gas stream is directed through towers A and B, said stream flows through the bed 10 of tower A and then passes into tower B to flow through the bed of that tower. On the regeneration cycle, the regeneration gas is not passed through the two towers on regeneration in series flow but rather is directed through said towers in parallel flow. Assuming towers A–1 and B–1 to be on regeneration, the regeneration gas is conducted thereto through line 28 and through branch line 30. Therefore, the total regeneration gas stream is divided so that a portion of the regeneration gas is directed through tower A–1 while the remainder is conducted through tower B-1. The regeneration gas flowing from tower A-1 does not pass through tower B-1 but rather is discharged through line 31. Similarly, the regeneration gas flowing through tower B-1 discharges through line 33. After passing through the towers independently of each other, these two regeneration gas streams may then be recombined and taken through the heat exchangers 37 and 23 to be cooled, after which they are conducted to the liquid accumulator whereby the desired fractions are removed as a liquid.

Before describing the operation in detail, it is well to consider the adsorbent characteristics of the commonly used adsorbents which are capable of extracting hydrocarbon fractions from a natural gas stream. As is well known, the more commonly used adsorbents are activated charcoal, silica gel, and activated alumina. Activated charcoal has a slightly greater adsorbent efficiency for gasoline components than does silica gel or activated alumina; the gasoline components are generally the pentanes, hexanes and heptanes. However, activated charcoal is much superior for the recovery of the lighter hydrocarbons such as ethane, propane and butane, which are generally known as LPG components. Although highly efficient for the recovery of the lighter hydrocarbons, activated charcoal is not capable of adsorbing any appreciable amounts of water vapor. On the other hand, silica gel and activated alumina are capable of dehydrating the gas stream as well as extracting hydrocarbon products. Also, silica gel has been found more efficient in adsorbing hydrocarbon fractions than activated alumina.

In view of the inherent characteristics of the adsorbents it is preferable to employ silica gel as the adsorbent material in the adsorption towers A and A-1 and to employ activated charcoal in the towers B and B-1. However, although these adsorbents are preferable, the invention is not to be limited to these specific adsorbent materials. It is also pointed out that although activated charcoal will efficiently extract the lighter hydrocarbons, such as ethane, propane and butane, it is sensitive to contamination and fouling of its adsorptive capacity. For example, even though fresh, activated charcoal may have a large adsorptive capacity for propane, it may rapidly lose this adsorptive capacity if the charcoal is exposed to heavier hydrocarbon fractions, such as hexanes. Therefore, if a material is to be used to adsorb the lighter hydrocarbons such as propane and butane, it will retain a higher adsorptive capacity for these materials with actual use if it is protected from exposure to the heavier hydrocarbon fractions.

The present invention provides a means whereby the adsorbent in towers B and B-1, which is provided for the purpose of adsorbing the lighter hydrocarbons, is at all times protected from exposure or contact with the heavier hydrocarbon fractions in the stream. This is true not only with respect to the main stream, but since separate regeneration streams through each pair of towers are employed, a regeneration stream which passes through towers A and A-1 does not pass through towers B and B-1. With this arrangement, highly efficient recovery of the lighter hydrocarbons can be accomplished.

In describing the operation of the process, it will be assumed that silica gel is the adsorbent material in towers A and A-1 and activated charcoal is in the towers B and B-1. With valves 12 and 20, as well as valves 16, 18, 27 and 36, in one position, the main gas stream will flow through towers A and B with these towers on an adsorbing cycle. At the same time, towers A-1 and B-1 are on a regeneration cycle. The main gas stream enters the tower A and flows through the adsorbent bed of silica gel which is capable of removing the heavier hydrocarbons such as the pentanes, hexanes and heptanes, which are generally referred to as gasoline fractions. The silica gel bed is also capable of dehydrating the stream and removing water therefrom. The main stream, being stripped of the heavier hydrocarbon fractions and with the water removed, is then passed into tower B. This tower contains an adsorbent material, such as activated charcoal, which is particularly adapted for removing the lighter hydrocarbons such as the propanes and butanes. Since the heavier hydrocarbons and water have been removed prior to passage to the tower B, it is evident that the adsorbent material in tower B is protected against exposure and contact with such heavier hydrocarbons. This maintains the adsorbent bed 10c in tower B at a high adsorptive capacity, and efficient adsorption of the lighter hydrocarbons is accomplished.

While towers A and B are on the adsorbing cycle, towers A-1 and B-1 are on the regeneration cycle. As has been explained, the regeneration cycle includes a heating period and a cooling period. At the start of the regeneration cycle, the hot regeneration gas is conducted through line 28 to the tower A-1, whereby said regeneration gas passes through the adsorbent bed 10a to extract the fractions which had been adsorbed on the previous adsorption cycle. This regeneration gas stream is discharged through line 31 from the tower A-1. At the same time, a separate stream of regeneration gas is conducted to tower B-1 through the branch line 30 and is discharged from this tower through outlet line 33. Both lines 31 and 33 are then joined at the valve 32 and the recombined stream thereafter conducted through the heat exchangers 37 and 23, the liquid accumulator 40, and finally returned to the heater for recycling. It is obvious that the regeneration gas stream which passes through the tower A-1 and which extracts the heavier hydrocarbons as vaporized liquids never flow through the tower B-1, and therefore the adsorbent material in tower B-1 is always protected from contamination by any of the heavier hydrocarbons.

During the cooling period of the regeneration cycle, the circulation of the regeneration gas is as above described, except that it is by-passing the heater 25. By circulating the cool regeneration gas through the respective beds during the latter portion of the regeneration cycle, the beds, or at least the upper portion thereof, are cooled so that the beds are prepared for the next adsorption cycle when the various valves are actuated to switch flows.

In the form of the invention shown in FIGURE 1, the switching of flows from one pair of towers A and B to the other pair of towers A-1 and B-1 is accomplished at the same instant. This is a desirable feature because, since the main gas stream flows in series through the two absorption zones, the residual heat which may be contained in the latter portion of the first adsorption zone A-1 will be flushed by the main gas stream through the second adsorption zone. This flushing of heat through the second adsorption zone occurs at the very start of the adsorption cycle which is at a time when the upper part of the second adsorption zone B-1 has been cooled; therefore, the adsorption efficiency of the second zone is not impaired because the flushing of the heat from the first zone is at a time when the second bed can well take care of the additional heat without interfering with the efficiency of the second adsorption zone.

By providing two separate adsorption zones or towers through which the main gas stream is directed in series, it is possible to employ separate adsorbent materials in the beds so as to accomplish more efficient recovery of both the so-called heavier hydrocarbon fractions and the so-called lighter hydrocarbon fractions. As noted, the first adsorption tower A may contain silica gel which has a high efficiency in adsorbing the heavier hydrocarbons and water. Activated charcoal, which has a higher efficiency for the adsorption of the lighter hydrocarbons, is contained in the second zone. The arrangement is such that the adsorbent material which is provided primarily for the purpose of removing the lighter hydrocarbons is at all times protected against contamination by the heavier hydrocarbons. Not only does the provision of two towers or zones permit a selection of different adsorbent materials, but it also allows the beds to be made of different sizes in accordance with the particular composition of the gas stream being treated. As illustrated in the drawings, the first zone A is shown as slightly larger than the second zone B on the assumption that a greater adsorptive capacity is necessary for heavier hydrocarbons in the particular stream being treated. However, it is possible that where the stream contains a greater ratio of the lighter hydrocarbons, the tower B and its bed may be larger in size than the tower A and its bed.

The liquids which are recovered in the liquid accumulator 40 are withdrawn therefrom through an outlet line 54, and these liquids may be separated into the desired products by the usual well known fractionating processes and apparatus. As has been noted, the particular valves and their control is subject to wide variation, and so long as the switching of the various valves which would accomplish the switching of flows in the desired manner is accomplished, the purposes of the present invention will be carried out.

In FIGURE 1, the regeneration circuit has been illustrated as a unitary circuit providing for divided flow to the two adsorption towers or zones. However, it would be possible and in some cases it may be desirable to provide a separate and independent regeneration circuit for each pair of adsorption towers. In FIGURE 2, such an arrangement is shown.

As illustrated in FIGURE 2, the main gas stream inlet 11 has connection with the valve 12 and with the towers A and A-1 through lines 13 and 14, in the manner heretofore described. Towers B and B-1 are connected to towers A and A-1 in series flow relationship. The main gas stream flow through towers A and B or A-1 and B-1, as the case may be, is the same as that heretofore described when each pair of towers is on the adsorbing cycle.

A separate and independent regeneration circuit is provided for the heavier hydrocarbon adsorption towers A and A-1 and also for the lighter hydrocarbon adsorption towers B and B-1. For the towers A and A-1, such circuit includes a heater 125 having a discharge conductor 126 connected with line 128. The line 128 is connected to a selector valve 55 which will direct the regeneration gas either through a line 128a or a line 128b to the towers A or A-1, depending upon which tower is on the regeneration cycle.

Assuming tower A to be on regeneration, the regeneration gas stream flows through the tower and is discharged therefrom by a discharge line 149 which has connection with a selector valve 56. Line 153 conducts the regeneration gas through an atmospheric cooler 137, then through a heat exchanger 123, after which the gas passes through a liquid accumulator 140 and is pumped by means of a pump 141 back to the heater 125. A valve 144 controls by-passing of the regeneration gas through a by-pass line 146. The regeneration circiut has communication with the main gas stream inlet through the balancing or breather line 154.

When the valves 55 and 56 have been operated to place the tower A-1 on regeneration, then the regeneration gas flows through tower A-1 and is discharged through a line 149a which passes through valve 56 and into line 153, from where it flows through the heat exchangers, liquid accumulator, and back to the pump 141. It is noted that the regeneration gas in the circuit for towers A and A-1 does not at any time flow through the towers B and B-1.

The towers B and B-1 are provided with their independent regeneration circuit which includes a heater 225 having a discharge conductor 226 extending therefrom and connected with a line 228. Line 228 has connection with a valve 155 which directs the regeneration gas either through lines 228a or 228b to the towers B or B-1. Regeneration gas discharges from the towers B and B-1 through lines 249 and 249a which have connection with a selector or control valve 156. From valve 156 flow is through line 253, then through atmospheric heat exchanger 237, heat exchanger 223, liquid accumulator 240, and pump 241. The by-pass valve 244 and by-pass line 246 are also provided and the balacing or breather line for this circuit is illustrated at 254.

The independent circuit for the regeneration gas which is directed through towers B and B-1 operates in the same manner as has been described. Since the regeneration gas circuit for the towers B and B-1 is entirely independent of the regeneration circuit of the towers A and A-1, it is possible to apply refrigeration to the regeneration gas stream which is assosciated with towers B and B-1 in order to increase the efficiency of recovery of lighter hydrocarbons. Keeping in mind that the tower A has functioned to remove the water and dehydrate the stream, the adsorbent material in towers B or B-1 has not adsorbed any water vapor. Therefore, when the regeneration gas stream is circulated through towers B or B-1 it merely picks up the lighter hydrocarbon fractions and the absence of water permits the use of a suitable outside refrigerating means, generally designated at 60 (FIGURE 2) in the regeneration circuit. The refrigerating means is illustrated as combined with the liquid accumulator 240 and since there is substantially no water in the regeneration stream, it is possible to greatly lower the temperature of the regeneration gas by means of the refrigeration means 60 with the result that greater efficiency of recovery of the lighter hydrocarbons may be obtained. Any suitable refrigeration unit may be employed, and with the arrangement described it is possible to lower the temperature of the regeneration gas stream considerably below the point to which it could be lowered if the main gas stream were being treated because of the elimination of any hydrate formation problem.

In this form of the invention, it is desirable that the flow be switched into each pair of towers to place them on the adsorption cycle at substantially the same instant in order to gain the advantage above mentioned with respect to flushing out the heat from the first adsorption zone without adverse effect upon the second adsorption zone. However, although it is preferable to place each pair of towers on adsorption at the same time, it is possible to switch the main stream into one pair of towers to place them on an adsorbing cycle at some time different than the start of the regeneration cycle for the other pair of towers.

Another form of the invention is illustrated in FIGURE 3, and this form is substantially identical to that shown in FIGURE 2 in that two separate regeneration circuits are provided, one for the towers A and A-1 and the second for the towers B and B-1. However, instead of employing the refrigeration means 60 in order to increase recovery of the lighter hydrocarbons, the form shown in FIGURE 3 substitutes an absorbing tower 61 for such refrigeration. The tower 61 provides a gas to liquid contacting zone wherein the desirable lighter hydrocarbons in the regeneration gas stream are scrubbed out by a liquid absorption stream which is introduced at 62. The liquid absorption stream entering at 62 has a selected vapor-liquid equilibrium characteristic which will increase the condensation and recovery efficiencies of the lighter hydrocarbons present in the regeneration gas stream. Said absorption stream and recovered products are removed from the tower or vessel 61 through an outlet line 63. The line 63 is connected with any conventional means, such as fractionation, for separating the desirable components.

Because of the cyclic type of operation, liquid products are being recovered only during a predetermined portion of the overall regeneration cycle and therefore, it is preferable to expose the regeneration gas stream to the absorption liquid only during the liquid recovery. Suitable valves (not shown) mounted in liquid absorption inlet line 62 and outlet line 63 are actuated to shut off flow to and from tower 61 throughout the regeneration cycle except for the liquid recovery period. Or, if desired, a valve-controlled by-pass line (not shown) may by-pass the absorption tower 61 to by-pass the regeneration gas around said tower except during the period of liquid recovery.

It is noted that the absorption tower arrangement which contacts the regeneration gas stream with a liquid absorption stream in the proper manner and time to increase recovery efficiency may be employed in any of the forms of the invention. In FIGURE 1, the absorption tower 61 would be substituted for the liquid accumulator 40. In the form shown in FIGURE 2, it may substitute for accumulator 140 in one regeneration circuit and for the refrigeration system 240 in the other circuit.

Although any type of fractionation may be employed, FIGURE 4 illustrates one arrangement which has been found satisfactory for fractionating the products produced and recovered by the process shown in FIGURE 3. Referring to FIGURE 4, this figure illustrates the liquid accumulator vessel 140 from which the heavier hydrocarbon fractions are conducted. It also illustrates the vessel or tower 61 within which the lighter hydrocarbons are recovered. As shown, the liquids from accumulator 140 are conducted through line 154 and are joined with the outlet line 63 extending from tower 61. Through a conductor 64, the combined liquid streams are passed into a surge tank 65 and from said tank into a well known type of fractionating tower 66. In tower 66 a separation is made with the flare or fuel gas being discharged through line 67; the products to be recovered are discharged through line 68 to another fractionating tower 69.

Within fractionating tower 69 a separation is made of the lighter hydrocarbons such as propane and butane (LPG components), which are discharged through line 70. The heavier hydrocarbon or gasoline fractions are discharged through line 71 and conducted to another fractionating tower 72, wherein a suitable absorbing liquid is separated. A portion of this absorption liquid is discharged through line 73 which is connected to the inlet 62 of adsorption vessel 61 wherein said liquid is directed in counter-current flow to the regeneration gas. The gasoline fractions or heavier hydrocarbons are recovered through line 74.

It will be evident that the fractionation step illustrated in FIGURE 4 is applicable to any of the forms of the invention. For example, in FIGURE 1 the liquids recovered in the liquid accumulator 40 and flowing from line 54 may be conducted to fractionation to separate the various desired products. Similarly, in the form shown in FIGURE 2, the liquids discharged from line 151 of accumulator 140 and the liquids discharged through line 241 from the accumulator 240 may be conducted to fractionation.

In all forms of the process and apparatus herein disclosed, the main gas stream flows through one adsorption zone wherein primarily the heavier hydrocarbons are removed and then through another adsorption zone wherein the lighter hydrocarbons are removed. The second adsorption zone is protected from contact with the heavier hydrocarbon fractions during the adsorption cycle because such heavier hydrocarbon fractions are removed in the first zone. The regeneration of the two adsorption zones is handled in such a way that the second zone is also protected from contact with the heavier hydrocarbon fractions during the regeneration cycle. In the form of FIGURE 1, the regeneration gas flows in parallel through the two towers, and then the recovered products are separated from the combined regeneration streams prior to recirculation of the regeneration gas back through the towers; therefore, the second adsorption zone is never contacted by the heavier hydrocarbons which may have been vaporized from the first adsorption zone. In the other forms of the invention, the two regeneration systems are completely separate and independent so that the second adsorption zone is never in contact with the products vaporized from the first adsorption zone.

The particular arrangement makes it possible to select adsorbent material so as to efficiently recover the particular fractions. The protection of the second zone from contamination by the heavier hydrocarbons assures increased recovery of the lighter hydrocarbons which constitute LPG components. Also, since the first zone also removes the water and dehydrates the stream before it contacts the second zone, the regeneration gas which passes through the second zone is substantially free of any water vapor. This permits outside refrigeration and excessive cooling of the regeneration gas stream which is passing through the second zone and greatly increases the recovery of the lighter hydrocarbons vaporized from said second zone. The provision of two separate regeneration circuits not only allows for the refrigeration as illustrated in FIGURE 2 but permits the use of an absorption tower or vessel such as 61, whereby increased recovery due to liquid-gas contact may be obtained. As previously pointed out, not only is it possible to employ different adsorbent materials in the different zones, but said zones may be sized and proportioned in accordance with the particular stream and its composition, which is a decided economic advantage in the design and construction of the apparatus.

What I claim is:

1. The process of recovering hydrocarbon fractions from a main gas stream including, flowing a main gas stream in series flow through a first adsorption zone to remove heavier hydrocarbon fractions and through a second adsorption zone to remove lighter hydrocarbon fractions from said main gas stream, stopping the flow of the main gas stream through both adsorption zones at the same time to discontinue removal of hydrocarbon fractions from the main stream, establishing a regeneration gas circuit which includes both of the adsorption zones, a heating zone upstream of the adsorption zones and a condensing and separating zone downstream of said adsorption zones, flowing, prior to the removal of any additional main stream hydrocarbon fractions by either the first or second adsorption zones, the heated regeneration gas from the heating zone and separating said regeneration gas into two streams which are simultaneously directed in parallel flow through the adsorption zones to extract the hydrocarbon fractions and to regenerate said adsorption zones, and thereafter conducting the regeneration gas through the condensing and separating zone to condense and recover the hydrocarbon fractions.

2. The process as set forth in claim 1, together with the additional step of establishing a communication between the regeneration gas circuit and a source of gas which is outside of said circuit, and flowing gas either from the regeneration circuit to said gas source or from said gas source into said regeneration circuit through the communication-establishing means in accordance with the pressure conditions obtaining in said circuit and said outside source, whereby the regeneration gas is properly conditioned to assure maximum recovery of the hydrocarbon fractions.

3. The process as set forth in claim 1, together with the additional step of establishing a communication between the regeneration gas circuit and a source of gas which is outside of said circuit, the gas in said outside source being leaner with respect to recoverable hydrocarbon fractions than is the regeneration gas during the regeneration cycle, and introducing leaner gas from said outside source into the regeneration gas circuit subsequent to the recovery of hydrocarbon fractions during the regeneration cycle, whereby the regeneration gas is diluted to increase its efficiency in extracting hydrocarbon fractions from the adsorption zones in a subsequent regeneration operation.

4. The process of recovering hydrocarbon liquid components from a main gas stream including, flowing the main gas stream through a first adsorption zone to remove heavier hydrocarbon components therefrom, then flowing the main gas stream in series flow through a second adsorption zone to remove lighter hydrocarbon components from the stream which lighter hydrocarbon components were not removed in the first zone, simultaneously stopping the flow of the main gas stream through said adsorption zones, circulating a regeneration gas through the first adsorption zone and also through a first condensing and separating zone, heating the regeneration gas at a point downstream of the condensing and separating zone and upstream of the discharge from the first adsorption zone whereby, as said regeneration gas circulates it regenerates the first adsorption zone and extracts the heavier hydrocarbon components which are subsequently condensed and separated as the gas passes through the condensing and separating zone, circulating regeneration gas through the second adsorption zone and also through a second condensing and separating zone at the same time that regeneration gas is circulated through the first zone, heating said regeneration gas at a point downstream of said second condensing and separating zone and upstream of the discharge of the second adsorption zone whereby as said regeneration gas circulates it regenerates the second adsorption zone and extracts the lighter hydrocarbon components which are subsequently condensed and separated as the gas passes through the second condensing and separating zone, and thereafter recovering the separated liquids which have been condensed and separated in said condensing and separating zones.

5. The process as set forth in claim 4, wherein the main gas stream is also dehydrated in the first adsorption zone, and together with the additional step of cooling the regeneration gas by refrigeration in the second condensing and separating zone, whereby increased recovery of the lighter hydrocarbon components due to lower temperature may be accomplished.

6. The process as set forth in claim 4, with the additional steps of combining the liquids recovered in the first condensing and separating zone with the liquids recovered in the second condensing and separating zone, and thereafter subjecting the combined liquid stream to fractionation to recover the desired hydrocarbon products.

7. The process of recovering hydrocarbon liquid components from a main gas stream including, flowing the main gas stream through a first adsorption zone to remove heavier hydrocarbon components therefrom, then flowing the main gas stream in series flow through a second adsorption zone to remove lighter hydrocarbon components from the stream which lighter hydrocarbon components were not removed in the first zone, stopping the flow of the main gas stream through said adsorption zones, circulating a regeneration gas through the first adsorption zone and also through a condensing and separating zone, heating the regeneration gas at a point downstream of the condensing and separating zone and upstream of the discharge from the first adsorption zone whereby, as said regeneration gas circulates it regenerates the first adsorption zone and extracts the heavier hydrocarbon components which are subsequently condensed and separated as the gas passes through the condensing and separating zone, circulating regeneration gas through the second adsorption zone and also through an absorbing and separating zone, heating said regeneration gas at a point downstream of the discharge of the absorbing and separating zone and upstream of the discharge of the second adsorption zone whereby as said regeneration gas circulates it regenerates the second adsorption zone and extracts the lighter hydrocarbon components which are subsequently liquefied and recovered as the gas passes through the absorbing and separating zone, and thereafter conducting the separated liquids from the condensing and separating zone and also from the absorbing and separating zone.

8. The process as set forth in claim 7, with the additional steps of combining the liquids recovered in the condensing and separating zone with the liquids recovered in the absorbing and separating zone, and thereafter subjecting the combined liquid stream to fractionation to recover the desired hydrocarbon products.

9. The process as set forth in claim 7, with the additional steps of combining the liquids recovered in the condensing and separating zone which is associated with the first adsorption zone with the liquids recovered in the absorbing and sparating zone which is associated with the second adsorption zone, thereafter subjecting the combined liquid stream to fractionation to recover the desired hydrocarbon products, and utilizing an absorbing oil which is obtained in the fractionation step in the absorbing zone to effect the extraction of the lighter hydrocarbon components from the regeneration gas.

10. The process of recovering hydrocarbon fractions from a main gas stream including, flowing the main gas stream through a first bed of adsorbent material to remove heavier hydrocarbon fractions therefrom, then flowing the main gas stream in series flow through a second bed of adsorbent material to remove lighter hydrocarbon fractions from the stream, simultaneously halting the flow of the main gas stream through the beds, establishing a first regeneration gas circuit for the first adsorbent material bed which circuit includes said bed, a heating zone and a condensing and separating zone, said heating zone being at a point between the condensing and separating zone and the bed, flowing a heated regeneration gas stream from the heating zone and through the bed to extract the heavier hydrocarbon fractions therefrom after which the regeneration gas passes through the condensing and separating zone wherein the heavier fractions are liquefied and separated, maintaining a communication between the regeneration gas circuit and a source of gas which is outside said circuit, the gas in said outside source being leaner with respect to recoverable hydrocarbon fractions than is the regeneration gas, flowing gas either from the regeneration circuit to said outside source or from said gas source into said circuit in accordance with pressure conditions obtaining in the regeneration circuit and said gas source, establishing a second regeneration gas circuit for the second adsorbent bed which circuit includes the second bed, a heating zone and a condensing and separating zone, said heating zone being at a point between the condensing and separating zone and the second bed, flowing a heated regeneration gas stream from the heating zone and through the second bed to extract the lighter hydrocarbon fractions therefrom after which the regeneration gas passes through the condensing and separating zone wherein said lighter hydrocarbon fractions are liquefied and separated, circulation through the second regeneration gas circuit being carried out simultaneously with the circulation through the first regeneration gas circuit, maintaining a communication between the second regeneration gas circuit and a source of gas which is outside said circuit, the gas in said outside source being leaner with respect to recoverable hydrocarbon fractions than is the regeneration gas, flowing gas either from the regeneration circuit to said outside source or from said gas source into said circuit in accordance with pressure conditions obtaining in the regeneration circuit and said gas source, and conducting the recovered liquids from the condensing and separating zones of said first and second regeneration circuits.

11. The process as set forth in claim 10, wherein the adsorbent material in the first bed is different from the adsorbent material in the second bed.

12. The process as set forth in claim 10, wherein the adsorbent material in the first bed is capable of removing water as well as the heavier hydrocarbon fractions and the adsorbent material in the second bed is highly efficient in removing the lighter hydrocarbon fractions.

13. The process as set forth in claim 10, together with the additional step of removing water from the main gas stream as said stream flows through the first bed, and the step of cooling the regeneration gas stream in the second regeneration gas circuit by refrigeration to increase the efficiency of condensation.

14. The process as set forth in claim 10, with the additional steps of combining the liquid recovered in the condensing and separating zone of the first regeneration circuit with the liquid recovered in the condensing and separating zone of the second regeneration circuit, and thereafter subjecting the combined liquid stream to fractionation to obtain desired liquid products.

References Cited in the file of this patent

UNITED STATES PATENTS

| | | |
|---|---|---|
| 2,689,624 | Davis | Sept. 21, 1954 |
| 2,722,999 | Bratzler et al. | Nov. 8, 1955 |
| 2,759,560 | Miller | Aug. 21, 1956 |
| 2,850,114 | Kehde | Sept. 2, 1958 |
| 2,868,326 | Gilmore | Jan. 13, 1959 |
| 2,880,818 | Dow | Apr. 7, 1959 |
| 2,910,139 | Matyear | Oct. 27, 1959 |
| 2,957,544 | Baker | Oct. 25, 1960 |

FOREIGN PATENTS

| | | |
|---|---|---|
| 283,508 | Great Britain | June 11, 1929 |